UNITED STATES PATENT OFFICE.

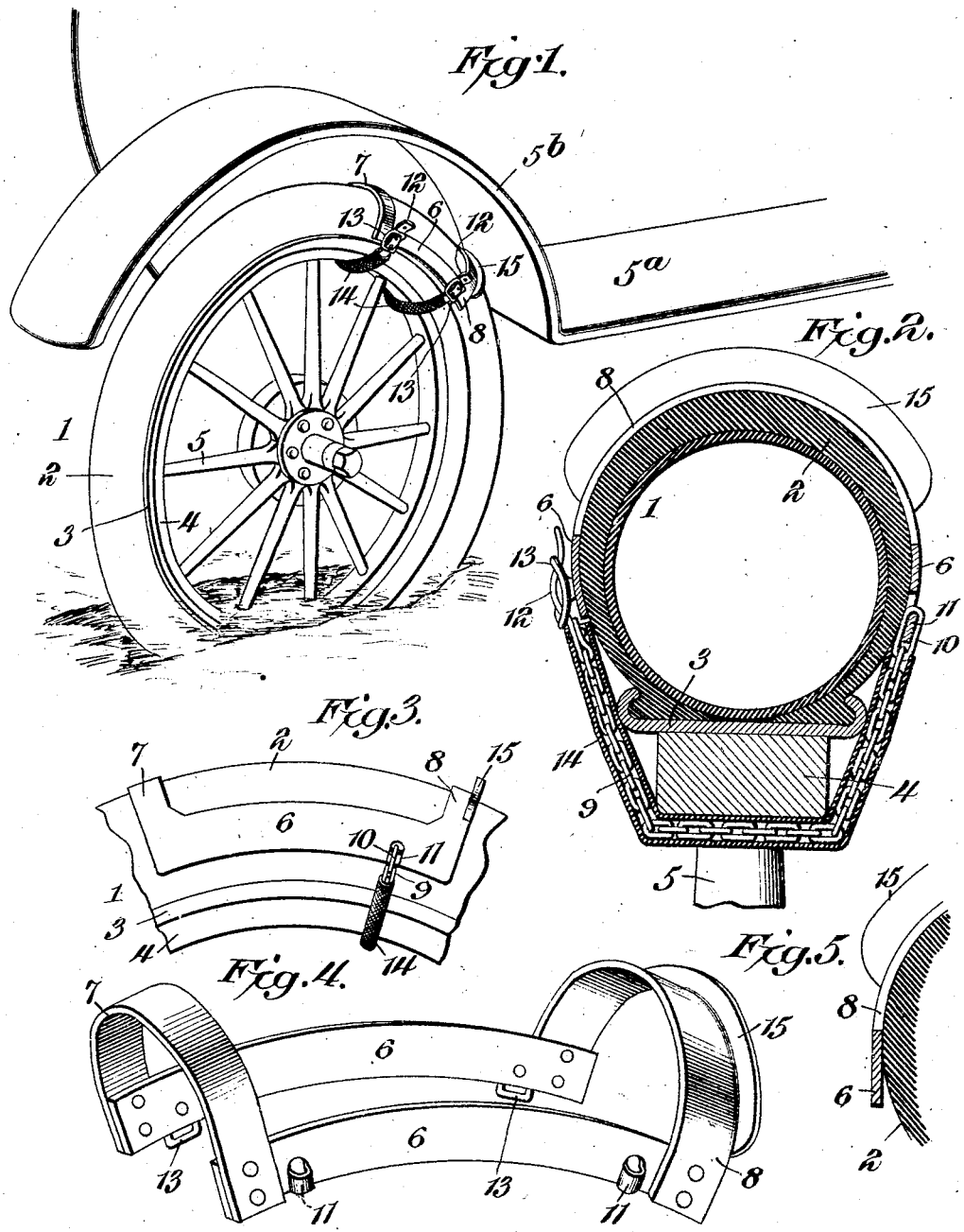

WALTER CREEK, OF LAS ANIMAS, COLORADO.

GRIPPING ATTACHMENT FOR AUTOMOBILE-WHEELS.

1,309,020.   Specification of Letters Patent.   Patented July 8, 1919.

Continuation in part of application Serial No. 875,012, filed December 1, 1914. This application filed October 29, 1915. Serial No. 58,657.

*To all whom it may concern:*

Be it known that I, WALTER CREEK, a citizen of the United States, residing at Las Animas, in the county of Bent and State of Colorado, have invented a new and useful Gripping Attachment for Automobile-Wheels, of which the following is a specification.

This invention has reference to attachments for automobile wheels capable of application from the running board of the vehicle and providing anti-slip engaging surfaces permitting the wheel on rotation under power to drive the automobile from a mud hole or other soft spot in the road bed in which the automobile is stalled.

In accordance with the present invention, there is provided an elongated frame conforming in general shape to a relatively small section of the tire and provided with holding members readily applied in embracing relation to the rim and felly of the wheel, while one end of the frame is provided with a substantially radial blade-like flange of such area as to engage the road bed, where soft, to an extent to provide such resistance of movement through the soft material that the vehicle is propelled in a direction to carry it out of the mud hole.

The invention will be best understood from a consideration of the following detailed description, taken in connection with the accompanying drawing forming a part of this specification, with the further understanding that while the drawing shows a practical form of the invention, the latter is not confined to strict conformity with the showing of the drawing, but may be changed and modified so long as such changes and modifications mark no material departure from the salient features of the invention, as pointed out in the claims.

In the drawings:—

Figure 1 is a perspective view of the rear wheel of an automobile and some adjacent parts, showing the mud gripping device in position.

Fig. 2 is a cross section of the rim of an automobile wheel with the attachment applied, the section being taken through one of the fastening devices.

Fig. 3 is an elevation of a mud gripping device provided with but one fastening device.

Fig. 4 is a perspective view of a somewhat modified construction of the mud gripping device.

Fig. 5 is a detail cross section through a portion of an applied mud gripping device, different in some respects from the structures of the other figures.

Referring to the drawings, there is shown in Fig. 1, an automobile wheel 1, provided with the usual pneumatic tire 2, rim 3, felly 4 and spokes 5. There is also shown a portion of a running board 5ª, and wheel fender 5ᵇ, all of these parts being common to automobiles and therefore requiring no special description.

The attachment of the present invention comprises an elongated frame consisting of side bars 6 and end yokes 7, 8 connecting the side bars 6, and conforming in curvature to the cross sectional curvature of the tire. The side bars 6 are curved lengthwise into general conformity with the circumferential curvature of the wheel and the yokes 7 and 8 are so disposed with relation to the side bars that when the attachment is applied to the wheel, the yokes are substantially or approximately radial to the wheel.

In one form of the invention, the yoke frame, made up of the side bars 6 and end yokes 7 and 8, is provided with a single fastening device as in Fig. 3, or with two fastening devices as in Fig. 1. These fastening devices may be alike in construction, and therefore a description of one fastening device will apply to either or both fastening devices.

Because of the strength and flexibility demanded of such a structure each fastening device comprises a chain 9 having at one end a link 10 engaging a loop 11 struck out from one of the side bars 6, this loop being located near the yoke 8 in the case where only a single fastening device is used, while when two fastening devices are used, there are two loops 11 near the respective yokes 7 and 8.

By striking out the loop 11 from the side bar 6, ample room is provided for the link 10 which therefore does not sink into the side of the tire 2 when the device is applied thereto. That end of the chain 9 remote from the link 10 has a strap 12 secured thereto while the other bar 6 has a buckle 13 made fast thereto, there being a single buckle where only a single fastening device is provided and two appropriately spaced buckles where two fastening devices are provided. It will be noted that the loop 11 and the buckle 13 are offset from the side bars so that the chains will not injure the tire by abrasion.

The chain or chains 9 are carried about the rim 3 and felly 4 between spokes 5 of the wheel, and in order to prevent the chain from marring the parts with which it comes in engagement there is provided a sheath 14 about the chain and this sheath may reach from a point adjacent to the link 10 to a point adjacent to the strap 12.

One of the end yokes of the mud gripping frame and in the particular showing of the drawing the yoke 8, is formed or provided with a flange 15 outstanding from the yoke in a direction substantially radial to the wheel or to the axis of curvature of the frame carrying the flange. Furthermore, the flange 15 is of a length to extend entirely across the tread of the tire.

The radial projection of the flange 15 will depend upon the conditions which the device has to meet.

For instance, in an actual working structure designed for 3½-inch tires, the frame of the structure is about nine inches in length with the flange 15 six inches in circumferential length and projecting from the yoke 8 about half an inch.

The frame of the device has the sole function of an elongated support extending circumferentially about the tire and as the frame is not intended to contribute to the tractive effect, it may be made of thin sheet metal, such for instance, as thin sheet steel of a suitable gage to avoid crumpling or bending.

The chains used in a structure of the size mentioned may be composed of 1 or 1¼-inch links.

The dimensions given are not to be taken as in any manner restricting the invention to any particular dimensions, but are stated as a guide only. It will be understood, of course, that the dimensions are susceptible of wide variation.

In the event of an automobile becoming stalled in a muddy or otherwise soft spot in a road way, the usual chains cannot be conveniently applied, and even if the attempt be made, it is necessary to lift the wheels of the automobile, this meaning that someone must stand in the muddy spot in the road.

With the present invention there is no necessity whatever for the occupant of the vehicle to leave the vehicle to apply the traction device to either or both of the rear wheels.

All that the occupant of the vehicle has to do is to stand on the running board and reach about the mud guard over the rear wheel, placing the frame made up of the side bars 6 and yokes 7 and 8 on a high part of the tire with the chains hanging pendently. This may be done with one hand and then the chains are readily moved about the felly between the spokes and the straps 12 may be inserted into the buckles 13 and there fastened, all the operations being performed by one hand, while the occupant of the vehicle supports himself with the other hand, as he stands on the running board. The traction device being applied at a high point on the wheel does not necessitate in its application to the wheel the assumption of any position by the occupant of the vehicle which would mean contamination by the mud in the road way.

Usually the flange 15 is arranged at what may be termed the front end of the traction device, considering such end as the forward end in the direction of rotation of the wheel when power is applied thereto, so that the traction device will readily engage the road bed and sink therein to a solid part whereupon the resistance afforded by the road bed is sufficient to cause the forward propulsion of the vehicle and its ultimate delivery from the mud hole.

It is not at all necessary that the chains 9 be applied in tight embracing relation to the felly since the resistance offered by the road bed will cause the taking up of any slack and the clamping of the frame on the tire.

It is not the design that the traction device remain upon the wheel longer than is necessary to cause the delivery of a stalled automobile from a mud hole or the like. As soon as the automobile is free the device is removed from the wheel. The removal of the device from the wheel may be accomplished without the necessity of getting out on the road way for the occupant of the vehicle need do no more than stand on the running board.

The frame of the device is of skeleton form with the central portion removed, for the sake of lightness and the structure may be conveniently stamped into shape in which case the entire frame, including the flange 15 is a one piece structure, as is shown in all the figures, except Fig. 4. In the last named figure the frame is shown with the side bars and yokes of separate construction riveted or otherwise secured together. The side bars may be curved transversely of their length into conformity with the curvature of the tire, as best shown in Fig. 2, or these side bars may be flat so as to lie tangentially with relation to the side walls of the tire, this last named arrangement being shown in Fig. 5.

The concaved side bar is the preferable construction as it avoids any chance of the device turning on the wheel. When in operation, no considerable stress is placed upon the side bars, as their function is to hold the yokes together. As the wheel rotates all the propulsive pressure is placed upon the yokes and the chain, dividing such pressure between the felly and the tire.

The advantages of the construction shown will be obvious. If the device consisted simply of the yoke 8 with the flange 15, the pressure against the flange would rock the yoke and force the rear edge thereof into the tire and tend to cut the latter, but by reason of the connection of the rear yoke 7 therewith, this tendency to rock is resisted and no injury to the tire results from the use of the device.

In the structure shown in Figs. 1 and 4, two fastening devices represented by the chains 9 are employed so that the elongated frame is positively held at both ends in engagement with the tire. In Fig. 3 the fastening chain is restricted to that end of the frame adjacent to the flange 15. Either form is effective in operation. In both forms, the connections of the chains or flexible elements to the side bars are made about two inches from the end of the frame.

The section of Fig. 2 may be taken as showing the structure of Fig. 3 or the structure of Fig. 1 where the chain fastening devices are reversed with respect to the showing of Fig. 1, since it is advisable to have rights and lefts for application to the rear wheels from the running board. Sometimes the road bed is in such condition that both wheels may become stalled in a mud hole and then it is advisable to employ two traction devices one for each wheel and if they be rights and lefts. the application of the devices to the wheels is greatly facilitated.

This application is a continuation of my application No. 875,012, filed December 1, 1914, except that the prior application does not disclose the protecting sheaths for the chains, nor side bars curved only in the direction of their length.

What is claimed is:—

1. A device for the purpose described, comprising a skeleton frame formed of a pair of elongated and longitudinally curved side bars, a curved yoke at each end of and connecting the side bars, the curvature of the yokes being substantially coincident with the transverse curvature of a tire to which the device is adapted to be applied, a rigid flange disposed transversely of the device and projecting from one of the yokes substantially radial thereto, and a flexible element secured to and carried by one of the side bars and adapted to be passed around the felly of a wheel and detachably connected to the opposite side bar for removably securing the device in place on a tire, the connections of said flexible element being located between the end and center portions of the side bars but nearer to the end thereof, whereby the device may be applied to an automobile by a person standing on the running-board of the automobile.

2. A mud shoe adapted to be secured upon a tire, and comprising a skeleton frame formed of a pair of elongated, longitudinally curved side bars, curved yokes connecting said side bars at their opposite ends and adapted to span the tread of a tire, one of the yokes being provided with a rigid flange projecting radially therefrom and having a curved engaging edge, and a pair of flexible elements secured at one of their ends to the side bars and carried thereby and adapted to be passed around the felly of a wheel and detachably connected at their other ends to the opposite side bar for securing the device detachably in place on the tire, said flexible elements being spaced apart and disposed nearer to the ends than to the center portions of the side bars, whereby the device may be applied to an automobile by a person standing on the running-board of the automobile.

3. A device for the purpose described, comprising a skeleton frame formed of a pair of elongated and longitudinally curved side bars, a curved yoke at each end of and connecting the side bars, the curvature of the yokes being substantially coincident with the transverse curvature of the tire to which the device is adapted to be applied, said side bars being curved transversely to fit the tire and the yokes being of a length to locate the side bars substantially midway between the tread and bead portions of the tire, a rigid gripping element disposed transversely of the device and projecting from one of the yokes substantially radial thereto, and a chain secured to and carried by one of the side bars and adapted to be passed around the felly of a wheel and detachably connected to the opposite side bar for removably securing the device in place on a tire, the connections of said chain being located between the end and center portions of the said side bars but nearer to the end thereof, whereby the device may be applied to an automobile by a person standing on the running-board of the automobile.

4. A shoe adapted to be secured upon a relatively small portion of a tire and comprising elongated, longitudinally curved side bars, curved yokes connecting the side bars at their ends and adapted to span the tread of the tire, the yokes being of a length to locate the side bars substantially midway between the tread and bead portions of the tire, one of the yokes being provided with a rigid flange projecting radially therefrom and having a convex engaging edge, and flexible elements rigidly connected at one of their ends to the side bars and carried thereby and adapted to be passed around the felly of the wheel and detachably connected at their other ends to the opposite side bars for removably securing the device in place on the tire, said flexible elements being disposed on the side bars between the yokes and the center portion of the shoe but closer to the yokes than to the center portion of the shoe and in spaced relation to said yokes, whereby the device may be applied to an automobile by a person standing on the running-board of the automobile.

5. A device for the purpose described, comprising a skeleton frame composed of a pair of elongated longitudinally curved side bars and transversely curved yokes constituting end portions of the frame and connecting the bars together, one of the yokes having a rigid flange thereon and extending radially therefrom and provided with a curved ground-engaging edge, and chains permanently connected to one of the side bars between the ends and center of the side bar but nearer to the ends than to the center and of a length to pass around the felly of the wheel to the other side bar, said chains having detachable connecting means for securing them to the last mentioned side bar, the connections between the ends of the chains and the side bars being offset from the latter, whereby the device may be applied to an automobile wheel by a person standing on the running-board of the automobile and having but one hand available for securing the device to the wheel, and whereby the chains are so spaced from the ground-engaging flange that the frame can neither turn nor slip in action.

In testimony that I claim the foregoing as my own I have hereto affixed my signature in the presence of two witnesses.

WALTER CREEK.

Witnesses:
THAD HUEY,
HOWARD B. SAUNDERS.